(12) United States Patent
Kawahara et al.

(10) Patent No.: US 9,574,313 B2
(45) Date of Patent: Feb. 21, 2017

(54) TSUNAMI BREAKWATER WALL OF RETAINING WALL STRUCTURE SUPPORTED BY STEEL PIPE PILES AND ITS CONSTRUCTION METHOD

(71) Applicant: The Chugoku Electric Power Co., Inc., Hiroshima (JP)

(72) Inventors: Kazufumi Kawahara, Hiroshima (JP); Yuichi Shimizu, Hiroshima (JP); Kouji Tasaka, Shimane (JP)

(73) Assignee: The Chugoku Electric Power Co., Inc., Hiroshima (JP)

( * ) Notice: Subject to any disclaimer, the term of this patent is extended or adjusted under 35 U.S.C. 154(b) by 320 days.

(21) Appl. No.: 13/676,245

(22) Filed: Nov. 14, 2012

(65) Prior Publication Data

US 2014/0133911 A1    May 15, 2014

(51) Int. Cl.
*E02B 3/12* (2006.01)
*E02B 3/06* (2006.01)
*E02B 3/04* (2006.01)

(52) U.S. Cl.
CPC .. *E02B 3/06* (2013.01); *E02B 3/04* (2013.01)

(58) Field of Classification Search
CPC ............... E02B 3/12; E02B 3/14; E02B 3/04; E02B 3/06; E02B 3/129; E02D 29/02; E02D 27/48; E02D 27/12
USPC ................ 405/16, 20, 21, 25, 29, 231, 232, 244,405/251, 276, 280, 284; 52/292, 293.1
See application file for complete search history.

(56) References Cited

U.S. PATENT DOCUMENTS

| 2008/0138155 A1* | 6/2008 | Kelley ............................ 405/21 |
| 2009/0232608 A1* | 9/2009 | Chouery ....................... 405/287 |

FOREIGN PATENT DOCUMENTS

| JP | 02101225 | * | 4/1990 | ..................... 55/292 |
| JP | 05-044206 |   | 2/1993 | |
| JP | 10-252036 |   | 9/1998 | |
| JP | 2001-003331 |   | 1/2001 | |
| JP | 2001159140 | * | 6/2001 | |

OTHER PUBLICATIONS

Missouri Department of Transportation Bridge Division, "Bridge Design Manual Section 3.62", Revised Sep. 9, 2011.*

* cited by examiner

*Primary Examiner* — Benjamin Fiorello
*Assistant Examiner* — Carib Oquendo
(74) *Attorney, Agent, or Firm* — Harness, Dickey & Pierce, P.L.C.

(57) ABSTRACT

A tsunami breakwater wall of retaining wall structure supported by a steel pipe pile (1), includes a steel pipe pile (2) that has a bottom end thereof reach a support layer (18) of a ground (16) and is installed to a ground such that an upper end thereof is positioned to a part below a surface of a ground (16), a retaining wall (3) that is placed on a ground (16) and supported by the steel pipe pile (2), and a ground anchor (6) that connects the retaining wall (3) and a support layer (18) of a ground (16).

5 Claims, 3 Drawing Sheets

TSUNAMI BREAKWATER WALL OF RETAINING WALL STRUCTURE SUPPORTED BY STEEL PIPE PILES AND ITS CONSTRUCTION METHOD

BACKGROUND

Technical Field

The present invention relates to a tsunami breakwater wall of retaining wall structure supported by steel pipe piles and its construction method. In particular, the invention relates to a tsunami breakwater wall of retaining wall structure supported by steel pipe piles and its construction method that is advantageous in withstanding tsunamis and earthquakes and effective for providing measures against tsunamis at areas such as seashores and seaports.

Related Art

The off the Pacific coast of Tohoku earthquake (the huge earthquake that occurred with the epicenter off the Sanriku Pacific Coast on Mar. 11, 2011) had brought damages due to the tsunami creating the need for immediate provision of tsunami-resistant facilities such as a tsunami breakwater and the like at the seashore, seaports and the like. Various facilities have already been built in these areas and are used for navigation of ships, cargo work, freight transport complex and the like and therefore, tsunami-resistant facilities such as tsunami breakwaters need to be built taking such circumstances into consideration.

Japanese Patent Application Laid-open Publication No. 5-44206 (PTL 1) describes an example of a breakwater. This breakwater is constructed by forming a mound by spreading crushed stone and the like over the ground of the seabed, installing bearing piles into this mound while allowing the upper portions of the bearing piles to protrude upward from the mound, loading concrete caissons on the mound and engaging the upper portions of the bearing piles to the energy absorbing material inside the depression provided to the bottom of the caissons.

According to the breakwater described in PTL 1, when an external force such as wave power and the like is applied to the breakwater, the energy acting on breakwater can be relieved by the energy absorbing material deforming due to the external force and absorbing the energy of the external force, thus allowing to alleviate the inclination and subsidence of the caisson on the mound thereby significantly improving the durability of the breakwater.

And another example of a breakwater is described in Japanese Patent Application Laid-open Publication No. 10-252036 (PTL 2). This breakwater has piles installed with intervals therebetween to form a retarding chamber in the sea at the front of the breakwater wall, a perforated plate vertically attached to these piles, and the piles and the perforated plate connected with a support rod to the front part of the breakwater.

The perforated plate includes a perforated plate main body composed of an approximately rectangular concrete planar member provided with thick protruding portions at the rear right and left parts thereof, and the perforated plate is vertically attached to the piles by inserting the piles into the penetration holes of these thick protruding portions. Further, a plurality of oblong holes is made in the vertical direction with intervals therebetween at the center of the front face of the perforated plate.

According to the breakwater described in PTL 2, improvement work of existing breakwaters can be performed without affecting existing breakwaters since the perforated plate and the breakwaters are configured independent of each other and the perforated plate is configured to be supported by being attached to the piles installed to the seabed.

Japanese Patent Application Laid-open Publication No. 2001-3331 (PTL 3) describes further another example of a breakwater. This breakwater includes a plurality of piles installed in two rows so that the head portions protrude from the surface of the seabed, a curtain wall is integrally provided to the row of piles on the off shore side and orthogonal to the direction in which the waves move, and a connecting block that is provided to integrate the top portions of the four piles.

The aforementioned curtain wall is formed by combining a plurality of approximately T-shape wave-dissipating blocks. Further, each of the wave-dissipating blocks has provided thereto a penetration hole that vertically penetrates each wave-dissipating block. And a wave-dissipating block and a pile are integrated by inserting the pile into this penetration hole.

According to the breakwater described in PTL 3, a curtain wall composed of a plurality of wave-dissipating blocks supported by a row of piles on the off shore side can be constructed by inserting each of the piles of the row of piles on the off shore side into the penetration holes of each of the wave-dissipating blocks. Additionally, the row of piles on the off shore side and the row of piles on the shore side can be integrated by integrating with a connection block the top portions of four piles of the row of piles on the off shore side and the row of piles on the shore side. Accordingly, the construction performance can be improved and thus allowing the construction cost to be reduced.

CITATION LIST

Patent Literatures

PTL1 Japanese Patent Application Laid-open Publication No. 5-44206
PTL2 Japanese Patent Application Laid-open Publication No. 10-252036
PTL3 Japanese Patent Application Laid-open Publication No. 2001-3331

By the way, the breakwaters with structures as those described in PTL 1 through 3 cannot satisfy the quake resistance and tsunami resistance based on the latest knowledge such as those on the off the Pacific coast of Tohoku earthquake and the like. Further, breakwaters of PTL 1 through 3 cannot be built when the area where measures against tsunamis are required are used as landing place and the like since they would block the operations of the landing place and the like.

SUMMARY OF THE INVENTION

The present invention has been made in view of the aforementioned conventional problems and an object thereof is to apply a tsunami breakwater wall of retaining wall structure supported by steel pipe piles and its construction method that satisfies quake resistance and tsunami resistance based on the latest knowledge such as those on the off the Pacific coast of Tohoku earthquake and the like and that is capable of being constructed while the landing space and the like maintains its operations even when the area where measures against tsunamis are required are used as landing place and the like.

In order to solve the problems as those described above, the present invention adopts a means as in the following. In other words, a tsunami breakwater wall of retaining wall structure supported by steel pipe piles according to an aspect of the present invention for solving the above-described problem, includes a steel pipe pile installed to a ground such that a bottom end thereof reaches a support layer of a ground and an upper end thereof is positioned to a part below a surface of a ground, a retaining wall placed on a ground and supported by the steel pipe pile, and a ground anchor for connecting the retaining wall and a support layer of a ground.

Additionally, in the present invention, a plurality of the retaining walls may be reverse T-shaped reinforced concrete blocks provided in a continuous single row on a ground of the area while a gap is not formed between adjacent retaining walls.

Further, in the present invention, the ground anchor may be installed to penetrate a bottom base part of the retaining wall and reach the support layer of the ground.

Further, a tsunami breakwater wall construction method according to an aspect of the present invention for solving the above-described problem, includes a process of forming a hole for a steel pipe pile that reaches a support layer of a ground, a process of erecting a steel pipe pile into the hole for a steel pipe pile, a process of placing a seawall on a ground and supporting the retaining wall by the steel pipe pile, and a process of installing a ground anchor that penetrates the retaining wall to reach the support layer, fixing a tip portion of the ground anchor to the supper layer and fixing a head portion of the ground anchor to the retaining wall.

DETAILED DESCRIPTION OF THE INVENTION

Figure 1:
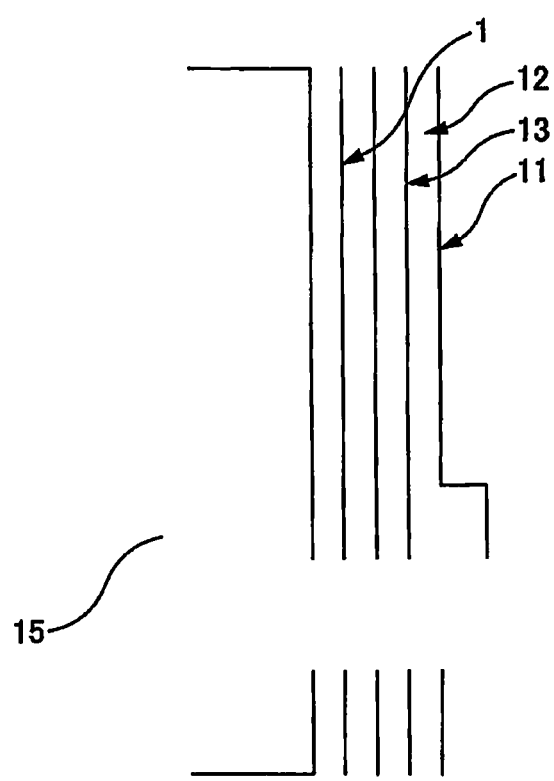
FIG. 1 is a schematic planar view of an embodiment of a tsunami breakwater wall of retaining wall structure supported by steel pipe piles according to the present invention.
Figure 2:
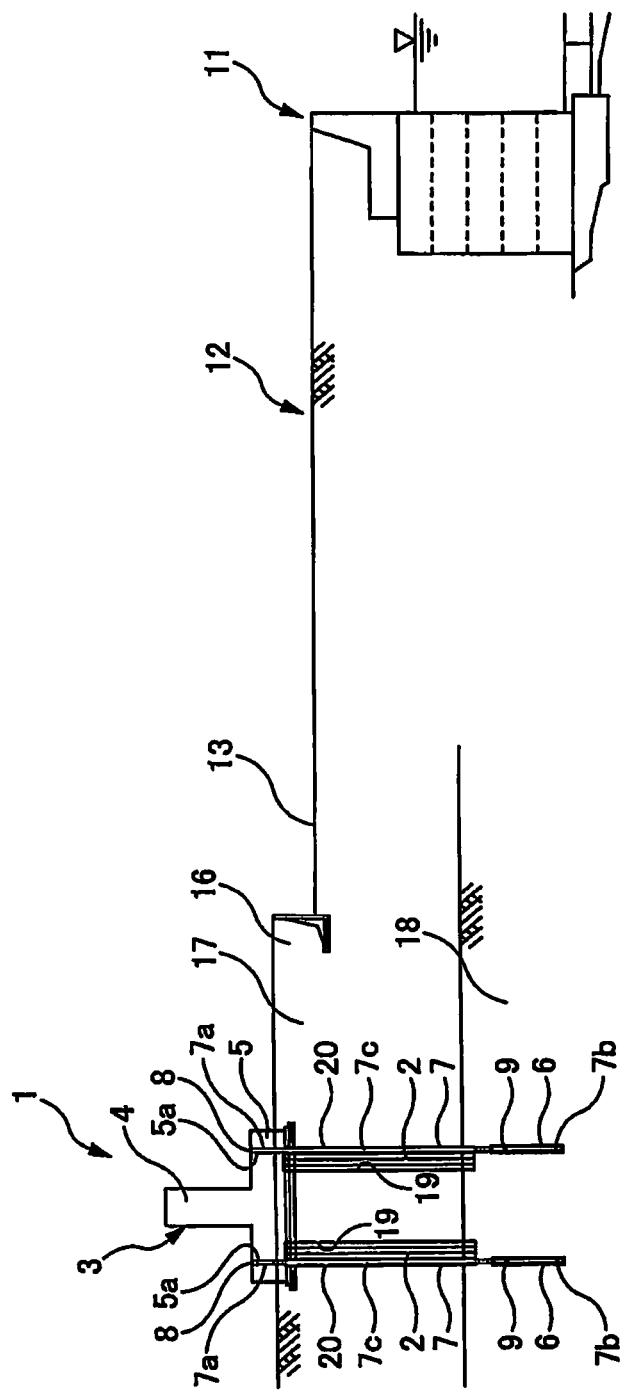
FIG. 2 is a sectional diagram taken along line A-A of FIG. 1.

Description of an embodiment of the present invention will be given with reference to the drawings. FIGS. 1-2 show an embodiment of a tsunami breakwater wall of retaining wall structure supported by steel pipe piles according to the present invention. The tsunami breakwater wall 1 of retaining wall structure supported by steel pipe piles of the present embodiment is effective in providing measures against tsunamis at areas such as seashores and seaports. In the present embodiment, the tsunami breakwater wall 1 is applied to an area at the seashore where a power plant facility 15 is built along the shoreline and the sea side of the power plant facility 15 is used as a landing place 12.

In the area of the seashore where the sea side of the power plant facility 15 is used as landing place 12, a seawall 11 is provided along the shoreline to protect the power plant facility 15 from high tides and tsunamis, the landing place 12 for landing operation is provided at a part on the land side of the seawall 11 and the power plant facility 15 is located on the land side of the landing place 12.

When measures against tsunamis are provided to such areas of the seashore, a tsunami breakwater wall 1 cannot be built to a part proximate the seawall 11 since such areas need to maintain the function as a landing place 12. Therefore, in the present embodiment, a relatively large space that functions as the landing place 12 is used for building a tsunami breakwater wall 1.

Specifically, the tsunami breakwater wall 1 is built to the part of the landing place 12 that is located along the power plant facility 15, the part that is located along the road 13, the part that is located along the seawall 11 and the like. And a breakwater door (not shown) capable of opening and closing for accessing to and from the landing place 12 is provided between tsunami breakwater walls 1 adjacent thereto.

The tsunami breakwater wall 1 is structured with steel pipe piles 2 installed at the landing place 12 in two rows at predetermined intervals, reverse T-shaped reinforced concrete retaining walls 3 supported by the steel pipe piles 2, and ground anchors 6 for fixing the retaining wall 3 to the support layer 18 of the ground 16.

The steel pipe piles 2 are made of large diameter steel pipes and are installed at the landing place 12 so that the bottom end thereof penetrates the backfill soil layer 17 of the ground 16 to reach the support layer 18, and the top end thereof is positioned slightly below the surface of the ground 16. Pipe piles with a diameter $\phi=1300$ mm are used as the steel pipe piles 2 in the present embodiment.

Columnar space is provided inside the steel pipe pile 2 and a tubular space is provided on the outer side of the steel pipe pile 2, and cementitious filling material is placed into these spaces according to need. The steel pipe piles 2 can be strengthened by placing filling material inside the steel pipe piles 2 and integrity of the structure can be achieved by placing filling material outside the steel pipe piles 2.

The retaining wall 3 is made of T-shaped reinforced concrete and is composed of a planar bottom base part 5 and an upright part 4 that is erected on the top central portion of the bottom base part 5. The retaining walls 3 are placed in a row so that the upright part 4 over the steel pipe piles 2 installed in two rows are orthogonal to the direction of the waves, and at the same time, gaps are not formed between the adjacent retaining walls 3. The bottom base part 5 of the retaining wall 3 has provided thereto anchor through holes 5a in penetrating states where ground anchors 6 are installed through the anchor through holes 5a and to the ground 16.

The ground anchor 6 is, for example, inserted into the ground anchor hole 20 drilled into the ground 16, and is composed of a tendon 7 made of prestressing steel the tip portion thereof being fixed to the support layer 18, a fixing means 8 for fixing the head portion 7a of the tendon 7 to the bottom base part 5 of the retaining wall 3, and grout material 9 for fixing the tip portion 7b and the fixing length portion 7c of the tendon 7 to the ground 16. The retaining wall 3 can be fixed on the top part of the ground 16 by inserting the tendon 7 into the ground anchor hole 20, fixing the tip portion 7b of the tendon 7 to the support layer 18, fixing the fixing length portion 7c to the backfill soil layer 17 of the ground 16, imparting tensile strength to the tendon 7 in the above state, and fixing the head portion 7a of the tendon 7 to the bottom base part 5 of the retaining wall 3 by the fixing means 8.

Next, description of the construction procedure for the tsunami breakwater wall 1 of the present embodiment structured in the above-described manner will be given. First, as shown in FIG. 3(a), two rows of holes for steel pipe piles 19 of a predetermined depth that reaches the support layer 18 are formed at predetermined intervals by using a crawler crane 25 to press the casing tube 26 into the ground 16 while drilling the part inside the casing tube 26.

Figure 3:
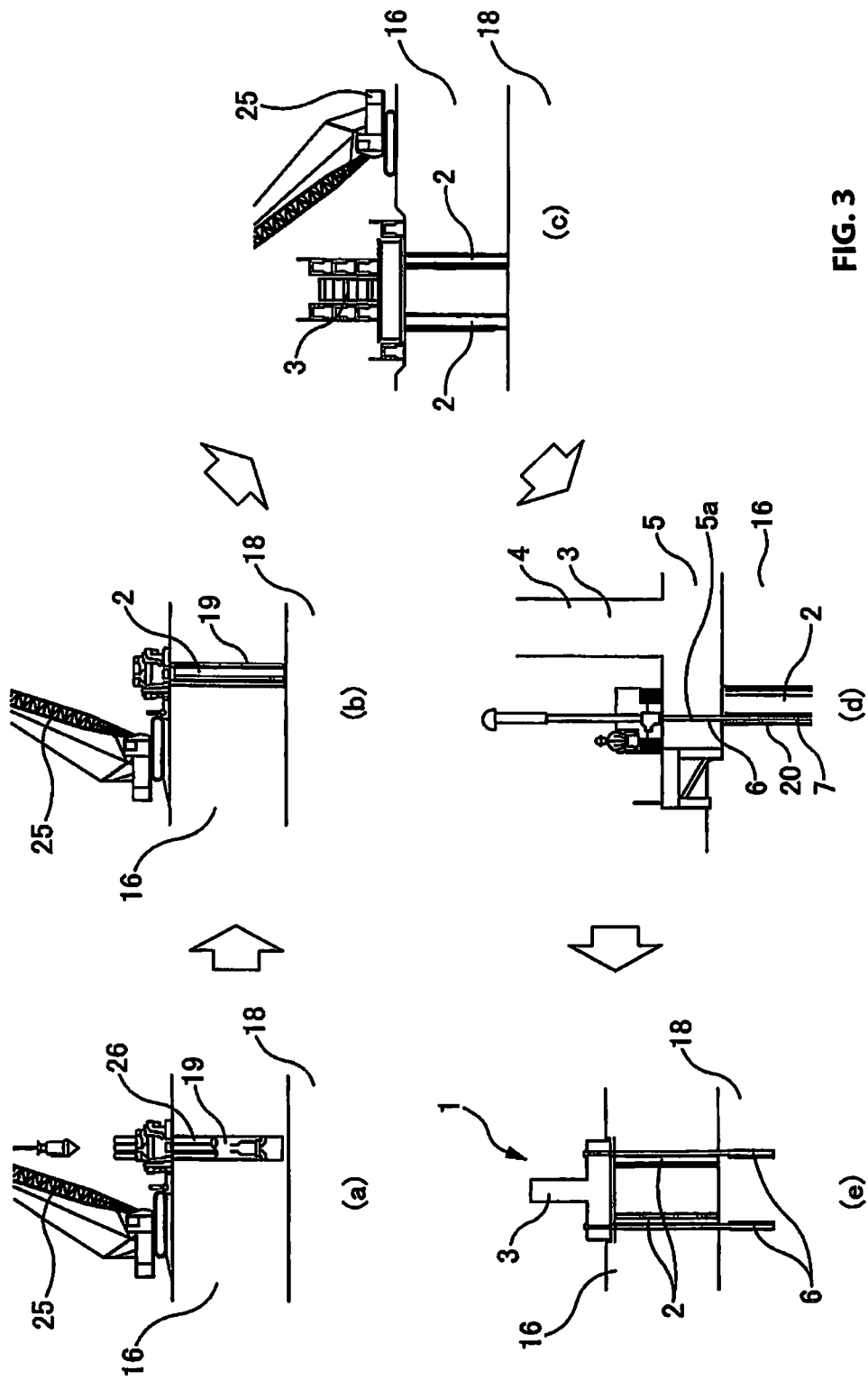
FIG. 3 is an explanatory diagram showing the construction procedures of the tsunami breakwater wall.

Then as shown in FIG. 3(b), with the use of the crawler crane 25, the steel pipe piles 2 are erected into the holes for steel pipe piles 19 formed in the ground 16, the lower end of the steel pipe piles 2 are made to reach the bottom of the holes for the steel pipe piles 19, and cementitious filling material is filled into the space inside and the space outside the steel pipe piles 2 according to need. The steel pipe piles 2 can be strengthened by placing filling material inside the steel pipe piles 2 and integrity of the structures can be achieved by placing filling material outside the steel pipe piles 2.

Thereafter, as shown in FIG. 3(c), the retaining wall 3 is built at the top part of the steel pipe piles 2 installed in two rows using the crawler crane 25.

Further, as shown in FIG. 3(d), with the use of an excavator 27, a plurality of ground anchor holes 20 of a predetermined depth that penetrates the bottom base part 5 of the retailing wall 3 to reach the support layer 18 of the ground 16 are drilled, tendons 7 of the ground anchors 6 are inserted into the ground anchor holes 20, and the tip of the tendons 7 are made to reach the bottom of the ground anchor holes 20.

Then by pouring grout material 9 into the ground anchor holes 20, the tip portions 7b of the tendons 7 of the ground anchors 6 are fixed to the support layer 18, the fixing length portions 7c of the tendons 7 are fixed to the backfill soil layer 17 of the ground 16, tensile strength is imparted to the tendons 7 in such state, and the head portions 7a of the tendons 7 are fixed to the bottom base part 5 of the retaining wall 3 by the fixing means 8.

In this way, as shown in FIG. 3(e), a tsunami breakwater wall 1 having the retaining wall 3 supported by the steel pipe piles 2 and the retaining wall 3 fixed to the support layer 18 by the ground anchors 6 can be built.

The tsunami breakwater wall 1 of the present embodiment structured in the aforementioned manner has a simple structure made by installing steel pipe piles 2 with the tips thereof reaching the support layer 18 of the backfill soil layer 17, constructing the retaining wall 3 on top of the steel pipe piles 2, and fixing the retaining wall 3 to the supper layer 18 of the ground 17 with ground anchors 6. Therefore, time, effort and expenses for construction can be saved.

The reinforced concrete retaining wall 3 having strength enough to withstand huge earthquakes and tsunamis is build on top of the ground 16 and this retaining wall is supported on the ground 16 with large diameter steel pipe piles 2. Therefore, when the retaining wall 3 is applied a horizontal force due to huge earthquakes, tsunamis and the like, the horizontal force can be transferred to the steel pipe piles 2 and further transferred to the backfill soil layer 17 and the support layer 18 of the ground 16 via the steel pipe piles 2.

Further, the retaining wall 3 is fixed to the support layer 18 of the ground 16 by the ground anchors 6. Therefore, the retaining wall 3 can be maintained in a state structured on the ground 16 even when horizontal force due to huge earthquakes, tsunamis and the like is applied to the retaining wall 3.

Furthermore, the connection between the retaining wall 3 and the steel pipe piles 2 is of a hinge structure rather than a rigid connection. Therefore, the steel pipe piles 2 can be prevented from being destroyed by the retaining wall 3 oscillating with regard to the steel pipe piles 2 even when horizontal force due to huge earthquake and tsunami force beyond assumption is applied to the retaining wall 3.

Even furthermore, tsunamis would not enter to the power plant facility 15 side through adjacent retaining walls 3 since gaps are not formed between the adjacent retaining walls 3.

The tsunami breakwater wall 1 can be built while the landing place 12 is in a state maintaining its operation even when the area of the landing place 12 is in use since relatively large space between the existing seawall 11 and the power plant facility 15 can be used for construction.

As mentioned above, the tsunami breakwater wall 1 of the present embodiment can satisfy the quake resistance and tsunami resistance based on the latest knowledge thus being able to sufficiently deal with seismic force and tsunami force due to huge earthquakes such as that of the off the Pacific coast of Tohoku earthquake and the like. Therefore, the power plant facility 15 can be prevented from being damaged by a tsunami.

Note that, in the above description the tsunami breakwater wall 1 of the present invention has been placed using relatively large space that is used as the landing area 12 in a seashore area where the power plant facility 15 is located, however, the tsunami breakwater wall 1 of the present invention may be located at areas of other seashores, seaports and the like where relatively large space can be secured.

REFERENCE SIGNS LIST 1 tsunami breakwater wall
2 steel pipe pile
3 retaining wall
4 upright part
5 bottom base part
5a anchor through hole
6 ground anchor
7 tendon
7a head portion
7b tip portion
7c fixing length portion
8 fixing means
9 grout material
11 seawall
12 landing place
13 road
15 power plant facility
16 ground
17 backfill soil layer
18 support layer
19 holes for steel pipe piles
20 ground anchor holes
25 crawler crane
26 casing tube
27 excavator

What is claimed is:

1. A tsunami breakwater facility including a plurality of tsunami breakwater walls of retaining wall structure placed in a row and supported by a steel pipe pile, each of said tsunami breakwater wall comprising:

steel pipe piles installed to a ground such that a bottom end thereof reaches a support layer of the ground and an upper end thereof is positioned to a part below a surface of the ground, filling material being placed inside the inner space of said steel pipe piles;

a reverse T-shaped retaining wall including a planar bottom base part and an upright part erected on the top of said bottom base part placed on the ground and supported by the steel pipe pile; and a ground anchor for connecting the retaining wall and the support layer of the ground, wherein the connection between the retaining wall and the steel pipe pile is of a hinge structure and said steel pipe piles are arranged in two rows along said retaining wall on both sides of said upright part, and wherein a door is provided between adjacent two of said tsunami breakwater walls.

2. The tsunami breakwater facility according to claim 1, wherein said plurality of the retaining walls are reverse T-shaped reinforced concrete blocks provided in a continuous single row on the ground of an area while a gap is not formed between adjacent retaining walls.

3. The tsunami breakwater facility according to claim 2, wherein the ground anchor is installed to penetrate the bottom base part of the retaining wall and reach the support layer of the ground.

4. The tsunami breakwater facility according to claim 1, wherein the ground anchor is installed to penetrate the bottom base part of the retaining wall and reach the support layer of the ground.

5. A tsunami breakwater facility construction method, comprising:

a process of forming holes for steel pipe piles that reach a support layer of a ground in two rows along a reverse T-shaped retaining wall including a planar bottom base part and an upright part erected on the top of said bottom base part;

a process of placing filling material inside the inner space of said steel pipe piles;

a process of erecting the steel pipe piles into the holes for the steel pipe piles;

a process of placing a plurality of said retaining walls in a row on the ground and supporting the retaining walls by the steel pipe piles so that connection between the retaining walls and the steel pipe piles is of a hinge structure and said steel pipe piles in two rows support said retaining wall on both sides of said upright part;

a process of installing a ground anchor that penetrates the retaining wall to reach the support layer, fixing a tip portion of the ground anchor to the support layer, and fixing a head portion of the ground anchor to the retaining wall; and a process of providing a door between adjacent two of said tsunami breakwater walls.

* * * * *